Figure 1:
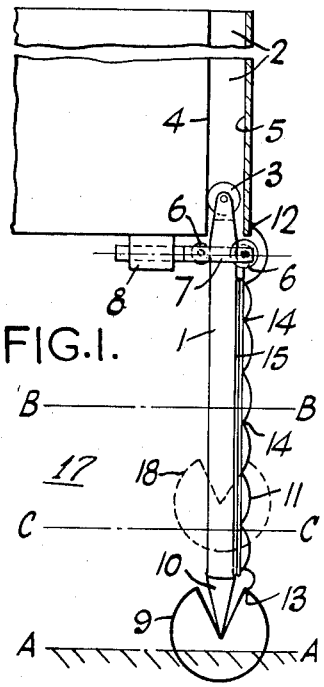

June 28, 1966  L. A. HOPKINS  3,258,079
AIR CUSHION VEHICLE WITH LIFTABLE FLEXIBLE SKIRT
Filed July 29, 1963  3 Sheets-Sheet 1

INVENTOR
L. A. HOPKINS
BY
Cameron, Kerkam & Sutton
ATTORNEYS

June 28, 1966     L. A. HOPKINS     3,258,079
AIR CUSHION VEHICLE WITH LIFTABLE FLEXIBLE SKIRT
Filed July 29, 1963     3 Sheets-Sheet 2

INVENTOR
L. A. HOPKINS
BY
Cameron, Kerkam & Sutton
ATTORNEYS

June 28, 1966     L. A. HOPKINS     3,258,079
AIR CUSHION VEHICLE WITH LIFTABLE FLEXIBLE SKIRT
Filed July 29, 1963     3 Sheets-Sheet 3
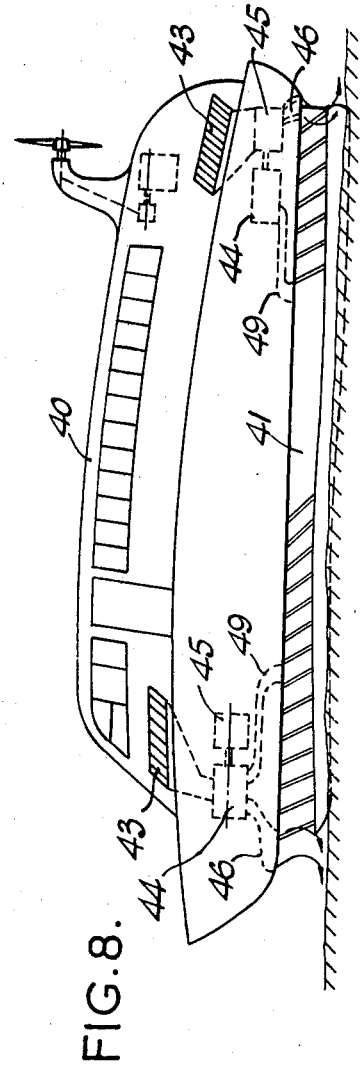
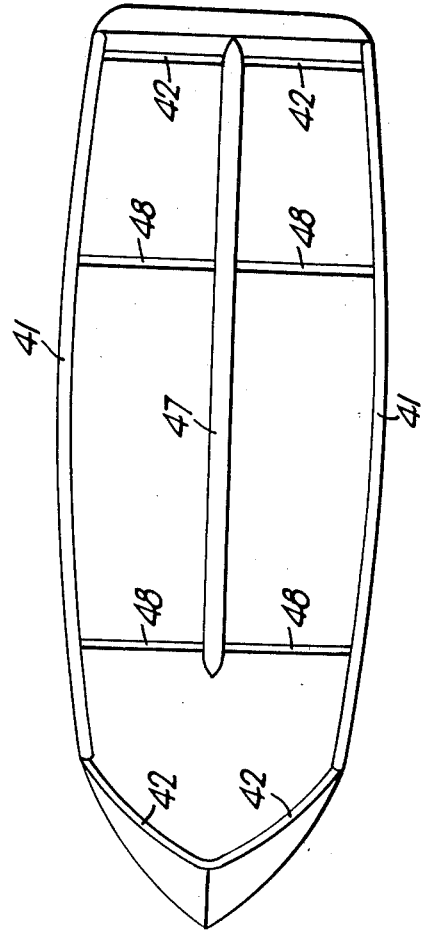
INVENTOR
L. A. HOPKINS
BY
Cameron, Kerkam & Sutton
ATTORNEYS United States Patent Office 3,258,079
Patented June 28, 1966

3,258,079
AIR CUSHION VEHICLE WITH LIFTABLE
FLEXIBLE SKIRT
Leslie Arthur Hopkins, Hythe, Southampton, England, assignor to Hovercraft Development Limited, London, England, a company of Great Britain
Filed July 29, 1963, Ser. No. 298,292
Claims priority, application Great Britain, July 30, 1962, 29,264/62
19 Claims. (Cl. 180—7)

This invention relates to vehicles for travelling over a surface and which are supported above the surface by one or more cushions of pressurised gas.

It has been proposed to contain the gaseous cushions along the sides of a vehicle by one or more walls depending from the bottom of the vehicle. Such walls may be of rigid or flexible construction and may or may not have provision for forming curtains of moving fluid from their lower edges.

The use of rigid walls is restricted to comparatively slow moving vehicles as, when the vehicle is operating over water or a land surface, the walls need to be of relatively strong construction to stand up to impacts with waves and foreign bodies in the water and obstacles and the like over land. At high speeds such impact loads are likely to be so high as to require a construction which would be too heavy for economic use. Moreover when operating over water, there is likely to be at least part of a wall at all times immersed in the water, and power requirements due to this immersion can assume an uneconomic proportion of the total power reqiurements at high speed.

The use of flexible walls has been proposed to offset the impact load, and other difficulties experienced with rigid walls. However, such walls have had a disadvantage in that, in order to make them stiff enough to contain the cushion pressure they do not deflect vertically or in a direction parallel to their length so readily as is desired. Generally it is found that such flexible walls must be made unnecessarily stiff in the direction parallel to their length in order to achieve sufficient stiffness in a direction normal to their length.

Thus flexible walls require to be sufficiently stiff normal to their length to withstand the cushion pressure differential across the wall yet readily deformable vertically and generally also in a direction along their length. According to the invention there is provided a vehicle for travelling over a surface and which is supported above the surface by at least one cushion of pressurised gas formed and contained in a space beneath the vehicle, the space being bounded, in a direction parallel to the fore and aft axis of the vehicle, by one or more flexible walls depending from the bottom of the vehicle, each wall comprising a series of downwardly depending legs each capable of vertical movement, lifting means for lifting the legs in accordance with variations in the level of the surface and flexible means connecting the legs to contain the cushion of pressurised gas.

The legs may be constrained to move vertically in a plane substantially parallel to the fore and aft axis of the vehicle. Further, to reduce bending loads on the legs due to any drag experienced by the lifting means, the legs may be constrained to a vertical and rotational translational movement in a plane substantially parallel to the fore and aft axis of the vehicle. By such a movement the drag will also assist in deflecting the legs, the legs swing back and also moving upwards. The construction of the legs can then be lighter only having to contain the cushion pressure.

The legs may be of rigid construction, being of wood or metal for example. Alternatively they may be of a sufficiently stiff material to withstand the cushion pressure differential but resiliently deflectable so as to be capable of deflecting sideways upon application of an exceptional overload to prevent or reduce the possibility of the legs being broken.

Figure 2:
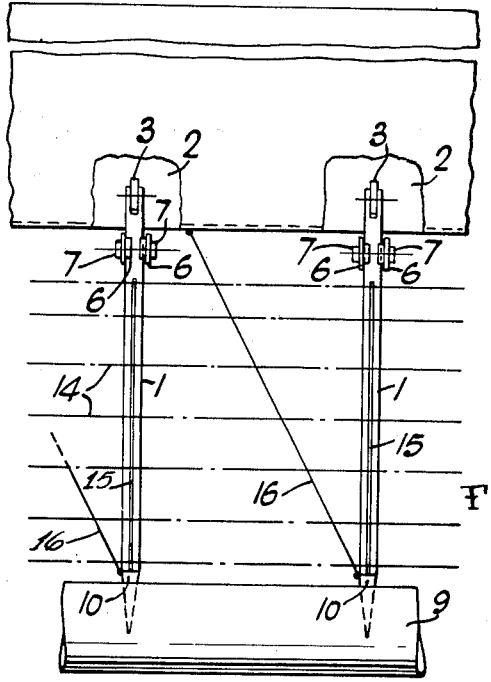
Figure 3:
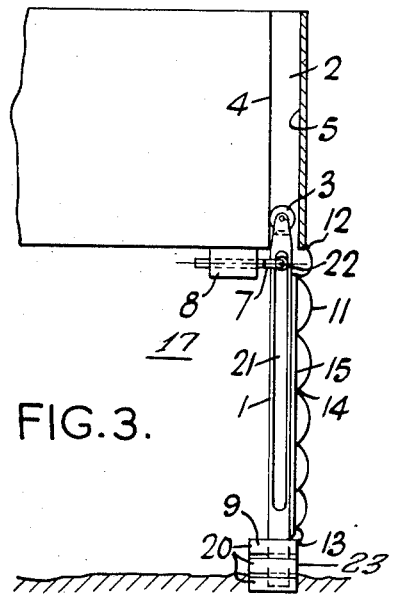
Figure 4:
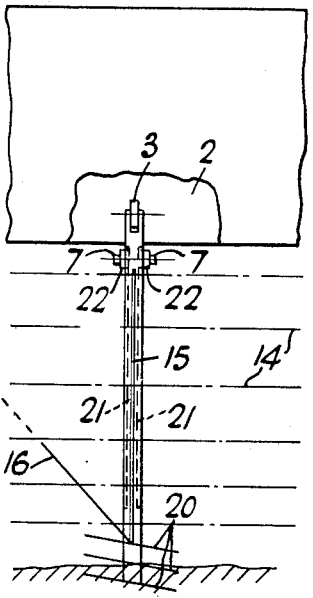
Figure 5:
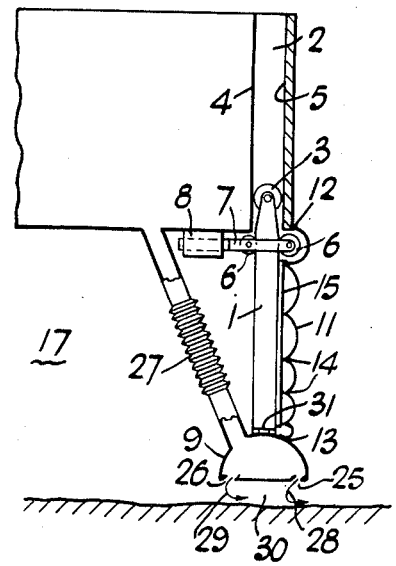
Figure 6:
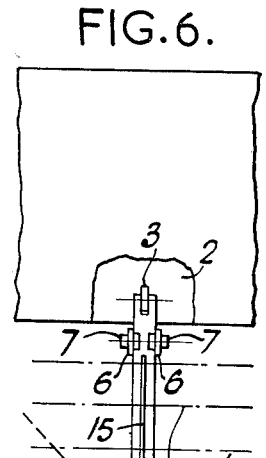
Figure 7:
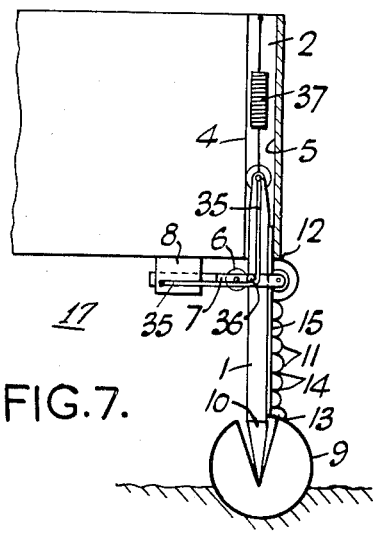

The invention will be readily understood by the following description of certain embodiments in conjunction with the accompanying drawings in which:

FIGURE 1 is a cross-section through a side of a vehicle, normal to the fore and aft axis thereof, illustrating one embodiment, FGURE 2 is a side view of the embodiment illustrated in FIGURE 1, FIGURE 3 is a similar view to that of FIGURE 1, illustrating some modifications thereto, FIGURE 4 is a side view of the embodiment illustrated in FIGURE 3, FIGURE 5 is a cross-section similar to that of FIGURE 1 illustrating a further embodiment, FIGURE 6 is a side view, similar to that of FIGURE 2, illustrating another embodiment, FIGURE 7 is a cross-section similar to that of FIGURE 1 illustrating further modifications thereof, FIGURE 8 is a diagrammatic side view of a vehicle embodying the invention, and FIGURE 9 is an inverted plan view of the vehicle illustrated in FIGURE 8.

FIGURES 1 and 2 illustrate a form of wall construction for a vehicle operating over water comprising a series of legs 1 of rectangular cross-section, the longest dimension of the cross-section being normal to the length of the wall, i.e., in the best direction for supporting the cushion pressure. The legs 1 slide upwards into a space 2 formed in the vehicle body and extending parallel to the fore and aft axis, the top end of each leg having a roller 3 which co-operates with the sides 4 and 5 of the space 2, the sides acting as guides. Each leg is also supported between rollers 6 which are carried in a yoke 7 which is pivotally supported in a bearing 8 rigidly attached to the main body of the vehicle. The axis about which yoke 7 can pivot is normal to the fore and aft axis of the vehicle. Each leg 1 is thus capable of vertical movement and also rotational movement about the axis of the bearing 8. Due to the guiding of the sides 4 and 5 of the space 2, each leg is constrained to movement in a plane parallel to the fore and aft axis of the vehicle.

The bottom ends of the legs are attached to a lift member 9 in the form of an inflated flexible tube. The connection between the bottom of each leg and the lift member 9 can be flexible such as by making the tapered section 10 of the leg of rubber or other flexible material. By positioning the attachment point of the leg to the lift member below the centre of gravity of the lift member, the stability of the lift member is improved.

To retain the cushion a flexible skin 11 is positioned to one side of the legs 1, the skin extending the length of the wall. The skin 11 is attached at its top edge 12 to the main body of the vehicle and at its bottom edge 13 to the lift member 9. At intermediate points 14 it is attached to the leg in such a manner that it can collapse as the legs move upwards. A convenient means of attachment is by a member 15 similar to a curtain rail attached to the outside face of the leg, the skin 11 being attached to and capable of sliding on the member 15. For clarity the skin 11 is omitted in FIGURE 2 but the points of attachment 14 are indicated by chain dotted lines. It will be seen that as the leg moves upward the skin 11 will collapse somewhat as a concertina. The member 15 is able to pass between the two outer rollers 6.

To prevent the legs all deflecting backwards to an undesired extent as soon as the vehicle starts to move forward, some initial constraint is required. As shown in FIGURE 2 this can be accomplished by providing a tie 16 extending diagonally upwardly and forwardly from the bottom end of each leg 1 to the vehicle body. It may be that it is sufficient to provide a tie for only the front leg, the skin 11 being of the right initial dimension to act as a constraint for the remaining legs. If the skin is not suitable for this purpose then an individual constraining tie for each leg can be as indicated in FIGURE 2. The angle which the legs are constrained to assume when fully extended may vary.

In FIGURE 1 the three lines A—A, B—B and C—C indicate the lowest and highest water levels and the mean or smooth water level respectively. Assuming that the the vehicle is operating over smooth water with the cushion of pressurised gas in being in the space 17 beneath the vehicle, then the leg is deflected upward to a position where the lift member 9 is at a position as indicated by the dotted lines 18. The legs will also be inclined, the bottom ends having moving rearward. It will be evident from the geometric relationship between the legs 1, their pivotal supports formed by rollers 6, yokes 7 and bearings 8, and the ties 16 illustrated in FIGURE 2, that rearward movement of the bottom end of any leg produces both a rotational movement of the leg about the axis of the associated yoke 7 and an upward movement thereof between the rollers 6, both of said movements being constrained to the vertical fore and aft plane established by the sides 4 and 5 of space 2. As the vehicle travels over waves so the legs will move up or down, the bottoms of the legs moving backward or forward. The flexibility of the flexible tube forming the lift member 9 plus any flexibility in the connection between the leg and lift member allows movement of the legs relative to each other.

FIGURES 3 and 4 illustrated modifications to the embodiment illustrated in FIGURES 1 and 2, common reference being applied to common items. The main modification is that the lift member 9 is formed by hydrofoils 20. In order to prevent escape of the cushion forming gas between the hydrofoils a flexible skin or wall 23 can be provided, attached to the outer extremities of the hydrofoils. Alternatively gas from the cushion can be allowed to escape between the hydrofoils. In order to ensure that hydrofoils always have a positive angle of attachment it may be necessary to provide means for pivotally mounting them on the bottom of the legs.

A further modification illustrated in FIGURES 3 and 4 is in the method of guiding and supporting the legs. Instead of each leg being supported by rollers 6 carried by the yoke 7 as in FIGURES 1 and 2, each leg has a recess 21 formed in its front side, and a similar recess in its rear side, rollers 22, carried by the yoke 7, cooperating with the recesses.

FIGURE 5 illustrates an alternative embodiment of the invention, similar in many respects to that illustrated in FIGURES 1 and 2, and, where applicable, common references have been applied. In this embodiment, the lift member 9 is in the form of a hollow flexible duct, in the bottom of which are formed two parallel supply ports 25 and 26. A gas is fed to the duct by means of flexible tubes 27 from a pressurising source on the vehicle. The gas issues from the supply ports 25 and 26 to form gaseous curtains 28 and 29, a small subsidiary cushion of pressurised gas being formed in the space 30 between the curtains 28 and 29. This subsidiary gaseous cushion acts to maintain the lift member 9 at a predetermined spaced relationship to the water surface. To allow for the inclination of the leg 1 relative to the lift member 9 as the leg moves upwards and inclines rearward, the leg is flexibly attached to the lift member at 31.

Walls generally of the form described above can also be used over land surfaces with minor modifications. The embodiment illustrated in FIGURE 5 can be used over relatively smooth surfaces or generally undulating surfaces without modification but where obstacles are met such as stones and the like, which exceed in height the clearance between the ground and the bottom surface of the lift member 9, it is possible for contact to occur causing damage to the lift member.

FIGURE 6 illustrates an embodiment similar in many respects to that illustrated in FIGURES 1 and 2, in which common references have been used where applicable, in which wheels are provided. The legs are connected at their bottom edges by a flexible member 32, to which wheels 33 are attached. The wheels thus apply the lifting force to the legs. To prevent the escape of the cushion forming gas beneath the member 32, the member can be in the form of a duct having a supply port formed in its bottom surface, fluid being supplied to the member and issuing to form a fluid curtain which seals the gap between the bottom of the member and the surface. In this form the member 32 will be very similar to the lift member 9 in FIGURE 5. Alternatively a thin flexible member may hang down from the bottom of the member. As the height to be sealed is quite small the difficulties normally associated with such flexible members are not so evident.

By providing the wheels with large inflated tires, a degree of amphibious operation can be obtained. Over suitable surfaces such as snow and ice, mud or the like, skids can be provided instead of wheels.

FIGURE 7 illustrates two further modifications as applied to the embodiment illustrated in FIGURES 1 and 2, similar references again being applied where applicable. To ensure that the legs 1 return downward when they have passed over a crest of a wave, it may be desirable to apply a return load to the leg. This may be done in various ways, for example by hydraulic means or by a load storing means such as a spring or one of more lengths of rubber cord. FIGURE 7 illustrates the use of a rubber cord or bungee 35 to store energy as the leg is deflected upwards, the energy stored being applied to return the leg downward. The bungee 35 is attached at one end to the top of the leg and is led downwards, round a pin or the like 36 on the yoke 7 and attached at its other end to the bearing 8. The free length of the bungee 35 can be arranged so that no load storing takes place until the leg has deflected upwards beyond the mean, or smooth water, position.

A further modification illustrated in FIGURE 7 is the provision of means for counter-balancing the legs. Thus, for example, as indicated diagrammatically in FIGURE 7, a spring 37 can be provided to counter-balance the weight of the leg. The degree of counter-balance provided will depend on requirements and may, for example, exactly balance the weight of the leg when in its lowest position. Both these modifications can be applied to the embodiment illustrated in FIGURES 5 and 6.

The legs can also be caused to deflect upwards by power operated means controlled by sensing means which sense the position of the surface relative to the leg or to the main body of the vehicle. Thus in the embodiment illustrated in FIGURES 3 and 4 the hydrofoils 20 can be arranged to actuate a control valve which in turn controls the actuation of an hydraulic jack or the like to deflect the leg similarly to the system illustrated in FIG. 19 of U.S. Patent No. 3,182,739. Sensing of cushion pressures in the space 30 of FIGURE 5 can also be used for the same purpose, as in the system of FIG. 16 of said Patent No. 3,182,739.

In vehicles having side walls, the gaseous cushions supporting the vehicles are normally contained at the front and rear by one or more curtains of fluid. By providing means for lowering the position from which the curtain forming fluid issues it is possible to raise the main body of the vehicle until the side walls are eventually completely clear of the surface. This is also described in the above-mentioned U.S. Patent No. 3,182,739. By this provision it is possible for a vehicle which normally operates over water, and having side walls in the form of one of the embodiments illustrated in FIGURES 1 and 2, 3 and 4, 5 or 7, to transfer from water to land and to then operate over the land if it is smooth.

Further, even without means to lower the position from which issues the curtain forming fluid, it is possible to transfer vehicles having side walls as illustrated in FIGURES 1 and 2, 3 and 4, 5 or 7 as the vehicle will operate at a particular clearance between the under-surface of the main body of the vehicle in accordance with the strength of the fluid curtains, and if the vehicle is propelled on to a slipway for example, the legs will deflect upwards and rearwards until this clearance exists between the under-surface of the main body and the slipway, the vehicle then proceeding up the slipway with the bottom edges of the walls just rubbing on the ground in the embodiments illustrated in FIGURES 1 and 2, 3 and 4 or 7, or with the member 9 at its predetermined relationship with the ground instead of the water.

Walls according to the invention can be used as side walls, i.e. walls which extend along each side of the vehicle, depending from the bottom surface thereof, and also as walls which subdivide the cushion space beneath the vehicle between such side walls, extending in a fore and aft direction.

FIGURES 8 and 9 illustrate a vehicle 40 in which the cushion of pressurised gas is contained at the sides of the vehicle by flexible walls 41, for example of the form illustrated in FIGURES 1 and 2 and described above. At the front and rear of the vehicle the cushion is contained by curtains of moving fluid issuing from supply ports 42 formed in the bottom of the vehicle. Air for forming the curtains is drawn in through intakes 43 by compressors 44 driven by engines 45. From the compressors 44 the air is supplied via ducts 46 to the supply ports 42.

The space occupied by the cushion of pressurised gas is subdivided longitudinally by a flexible wall 47, for example also of the form as illustrated in FIGURES 1 and 2. The space occupied by the cushion is further subdivided normal to the fore and aft axis of the vehicle by curtains of moving fluid issuing from transverse ports 48. Air is supplied to the transverse ports 48 from the compressors 44 via ducts 49.

What we claim is:

1. A vehicle for travelling over a surface and which is supported above the surface by at least one cushion of pressurised gas formed and contained in a space beneath the vehicle, the space being bounded, in a direction parallel to the fore and aft axis of the vehicle, by at least one cushion containing wall depending from the bottom of the vehicle, the wall comprising a series of downwardly extending legs of fixed length disposed in tandem and laterally spaced from one another in a vertical plane substantially parallel to the fore and aft axis of the vehicle, lifting means for lifting said legs vertically in accordance with variations in the level of the surface beneath the vehicle, guide means for constraining said legs to movement in said vertical plane relative to the vehicle body, said guide means including support members mounted on the vehicle body for rotation about substantially horizontal axes normal to said vertical plane, said legs being slidable vertically in said support members so that said legs can also rotate in said plane when the bottom ends of said legs move rearwardly or forwardly relative to the vehicle body, flexible sheet means attached to and extending between neighbouring legs of the tandem series so as to at least partly contain the vehicle supporting cushion, and means for limiting rearward movement of the lower ends of said legs relative to the vehicle body, said last named means being effective to convert rotational movement of said legs due to rearward movement of the lower ends thereof into vertical movement thereof.

2. A vehicle as claimed in claim 1 wherein the lifting means comprises at least one member in contact with the surface.

3. A vehicle as claimed in claim 2 for operation over water wherein the lifting means comprises at least one flexible member adaptable to follow the surface and extending in a direction parallel to the wall.

4. A vehicle as claimed in claim 1 wherein the lifting means comprises at least one member in contact with the surface associated with each leg.

5. A vehicle as claimed in claim 1 wherein the lifting means comprises a series of wheels in contact with the surface.

6. A vehicle as claimed in claim 1 wherein the lifting means comprises at least one member adapted to be maintained in a predetermined spaced relationship to the surface, and means for forming at least one cushion of pressurised gas between said member and said surface.

7. A vehicle as claimed in claim 6 wherein said member comprises a hollow flexible member, and including means for feeding gas to the member and causing it to issue from the lower part of the member to form at least one cushion of pressurised gas beneath the member.

8. A vehicle as claimed in claim 7 wherein said hollow flexible member comprises an inflatable member.

9. A vehicle as claimed in claim 1 wherein the lifting means comprises a hollow flexible member extending in a direction parallel to the direction of the wall, two parallel supply ports formed in the bottom surface of the member and extending for the length of the member, and means for supplying a gas under pressure to said member, the fluid issuing from the supply ports to form two parallel curtains of moving fluid which form and contain at least one subsidiary cushion of pressurised gas beneath the member.

10. A vehicle as claimed in claim 1 wherein the legs are rigid.

11. A vehicle as claimed in claim 10 wherein each leg has a flexible portion at its bottom end.

12. A vehicle as claimed in claim 1 wherein the said space is bounded on the sides by at least one of said walls extending along each side of the vehicle, and including means for forming at least one curtain of moving fluid extending between the ends of the walls, at each end of the vehicle, for bounding the ends of said space.

13. A vehicle as claimed in claim 12 wherein the said space is subdivided longitudinally by at least a further one of said walls extending parallel to the fore and aft axis of the vehicle.

14. A vehicle as claimed in claim 13 including means for forming transverse curtains of moving fluid to further subdivide the said space.

15. A vehicle for travelling over a surface and which is supported above the surface by at least one cushion of pressurised gas formed and contained in a space beneath the vehicle, the space being bounded, in a direction parallel to the fore and aft axis of the vehicle, by at least one cushion containing wall depending from the bottom of the vehicle, the wall comprising a series of legs of fixed length depending downwardly from the vehicle body and laterally spaced from one another in a vertical plane substantially parallel to the fore and aft axis of the vehicle, means for so connecting said legs to the vehicle body as to permit both vertical and rotational movement of each leg individually relative to said body, said means including a pair of guide surfaces parallel to said vertical plane disposed above the bottom surface of the vehicle body and spaced apart so as to receive the upper ends of said legs and constrain the latter to movement in said vertical plane above and below said bottom surface, and support means for each of said legs mounted on the vehicle body for rotation about a substantially horizontal axis normal to said vertical plane and disposed adjacent to said guide surfaces, whereby the upper end of each leg can rotate between said guide surfaces about the axis of rotation of said support means when the lower end of said leg moves rearwardly or forwardly relative to the vehicle body while also sliding vertically in said support means, lifting means for moving said legs vertically in accordance with variations in the level of the surface over which the vehicle is travelling, a vertically disposed flexible skin attached to and extending between adjacent legs of said series so as to at least partly contain said vehicle supporting cushion of pressurised gas and means for limiting rearward movement of the lower ends of said legs relative to the vehicle body, said last named means being effective to convert rotational movement of said legs due to rearward movement of the lower ends thereof into vertical movement thereof.

16. A vehicle as claimed in claim 15 wherein the means for limiting rearward movement of the lower ends of said legs comprises a tie extending diagonally upwardly and forwardly between the lower end of each leg and the vehicle body.

17. A vehicle as claimed in claim 15 wherein said flexible skin extends the length of the wall and is attached at its upper edge to the vehicle body and at its lower edge to said lifting means, and including means for slidably attaching said skin to each of said legs at a plurality of points intermediate the upper and lower edges thereof as that the skin can collapse in concertina fashion during upward vertical movement of the legs.

18. A vehicle as claimed in claim 15 wherein said lifting means comprises an inflated flexible tube extending longitudinally of the wall, and including means forming a flexible connection between the bottom of each leg and said tube.

19. A vehicle as claimed in claim 18 wherein the bottom end of each leg is tapered and extends into a depression in the upper surface of said tube to a point of connection below the center of gravity of said tube.

References Cited by the Examiner

UNITED STATES PATENTS 3,172,494   3/1965   Cockerell _____ 180—7

FOREIGN PATENTS 1,238,499   7/1960   France.

BENJAMIN HERSH, *Primary Examiner.*

M. S. SALES, *Assistant Examiner.*